United States Patent
Keller et al.

(10) Patent No.: US 10,470,563 B2
(45) Date of Patent: Nov. 12, 2019

(54) HEIGHT-ADJUSTABLE PIECE OF FURNITURE AND CABLE PROTECTOR FOR SUCH A PIECE OF FURNITURE

(71) Applicant: VITRA PATENTE AG, Birsfelden (CH)

(72) Inventors: Stefan Keller, Steinen-Hofen (DE); Helmut Schütt, Müllheim-Hügelheim (DE)

(73) Assignee: VITRA PATENTE AG, Birsfelden (CH)

( * ) Notice: Subject to any disclaimer, the term of this patent is extended or adjusted under 35 U.S.C. 154(b) by 0 days.

(21) Appl. No.: 15/987,281

(22) Filed: May 23, 2018

(65) Prior Publication Data
US 2018/0338608 A1 Nov. 29, 2018

(30) Foreign Application Priority Data
May 24, 2017 (EP) .................................... 17172607

(51) Int. Cl.
*A47B 21/06* (2006.01)
*A47B 9/20* (2006.01)
(Continued)

(52) U.S. Cl.
CPC ................ *A47B 21/06* (2013.01); *A47B 9/20* (2013.01); *A47B 21/02* (2013.01); *G01L 1/18* (2013.01);
(Continued)

(58) Field of Classification Search
CPC .............. A47B 9/00; A47B 9/12; A47B 21/06
(Continued)

(56) References Cited

U.S. PATENT DOCUMENTS

| 4,969,403 A | 11/1990 | Schwartz et al. |
| 5,041,705 A | 8/1991 | Piccoli |

(Continued)

FOREIGN PATENT DOCUMENTS

| EP | 1 460 914 A1 | 9/2004 |
| JP | H03-131208 A | 6/1991 |

OTHER PUBLICATIONS

European Search Report dated Aug. 31, 2017 in corresponding European Patent Application No. 17 172 607.8, with pp. 1-3 translated into English.

*Primary Examiner* — Jose V Chen
(74) *Attorney, Agent, or Firm* — Medler Ferro Woodhouse & Mills PLLC

(57) ABSTRACT

A height-adjustable piece of furniture includes a lower part, an upper part, an actuating device, first and second reference sections and a deformation sensor. Distance between the lower and upper parts can be adjusted by the actuating device. The deformation sensor is arranged to detect change between the first and second reference sections and is connected to the actuating device such that a signal of the deformation sensor can be transmitted to the actuating device. The actuating device is configured to stop the change in distance between the lower and upper parts if the signal transmitted by the deformation sensor corresponds to a change in distance that exceeds predefined threshold values. A cable protector is also provided for a cable to be mounted, and is coupled to the first and second reference sections such that tensile force acting on the cable causes change between the first and second reference sections.

13 Claims, 4 Drawing Sheets

(51) Int. Cl.
*A47B 21/02* (2006.01)
*G01L 1/18* (2006.01)
*H02G 3/04* (2006.01)

(52) U.S. Cl.
CPC .... *H02G 3/0456* (2013.01); *A47B 2200/0054* (2013.01); *A47B 2200/0056* (2013.01)

(58) Field of Classification Search
USPC .................................... 108/20, 147, 144.11
See application file for complete search history.

(56) References Cited

U.S. PATENT DOCUMENTS

| | | | | |
|---|---|---|---|---|
| 5,665,947 A * | 9/1997 | Falcon | ................ | H01H 3/0226 200/543 |
| 5,927,213 A * | 7/1999 | Leday | ................ | A47B 17/02 108/102 |
| 6,286,441 B1 * | 9/2001 | Burdi | ................ | A47B 9/00 108/147 |
| 6,365,850 B1 * | 4/2002 | Arnold | ................ | H01H 3/0226 200/17 R |
| 6,501,040 B2 * | 12/2002 | Hall | ................ | H01H 3/0226 200/17 R |
| 7,658,359 B2 * | 2/2010 | Jones | ................ | A47B 9/00 248/406.1 |
| 7,687,728 B2 * | 3/2010 | Poyner | ................ | H01H 3/20 200/17 R |
| 8,089,012 B2 * | 1/2012 | Mohtasham | ................ | H01H 3/42 200/334 |
| 2004/0166977 A1 * | 8/2004 | Nielsen | ................ | A47B 9/12 474/148 |
| 2009/0320206 A1 * | 12/2009 | Dyreby | ................ | A47B 9/20 5/611 |
| 2011/0168064 A1 * | 7/2011 | Jahnsen | ................ | A47B 9/00 108/147 |
| 2011/0203496 A1 * | 8/2011 | Garneau | ................ | A47B 9/20 108/147 |

* cited by examiner

HEIGHT-ADJUSTABLE PIECE OF FURNITURE AND CABLE PROTECTOR FOR SUCH A PIECE OF FURNITURE

CROSS-REFERENCE TO RELATED APPLICATIONS

This patent application claims priority to European Patent Application No. 17172607.8, filed May 24, 2017, which is hereby incorporated by reference herein in its entirety.

TECHNICAL FIELD

The invention relates to a height-adjustable piece of furniture and to a cable protector. Such height-adjustable tables typically comprise a lower part which can be set down on the floor, an upper part, an actuating device, a first reference section, a second reference section and a deformation sensor. A distance between the lower part and the upper part can be adjusted by means of the actuating device. The deformation sensor is connected to the actuating device such that a signal from the deformation sensor can be transmitted to the actuating device. The deformation sensor is arranged to detect a change between the first reference section and the second reference section. The actuating device stops a change of the distance between the lower part and the upper part if the signal transmitted by the deformation sensor corresponds to a deformation between the first reference section and the second reference section which exceeds a predefined threshold value. Such pieces of furniture can for example be used in offices in the form of desks as workstations for alternating standing and sitting work.

BACKGROUND OF THE INVENTION

When using many pieces of furniture and in particular office furniture such as desks or work tables, it is necessary to wire electrical devices into or onto the pieces of furniture. For example, peripheral computer equipment such as monitors, keyboards and computer mice are typically arranged on the tabletops of desks, whereas the computer itself is positioned under the tabletops. The power supply is also normally provided along the floor or from below. The power cables and communication cables are therefore frequently routed from below to the piece of furniture, for example onto a tabletop of a desk.

Irrespective of the wiring, height-adjustable pieces of furniture, such as height-adjustable desks, particularly in the form of workstations, have been known for some time. The possibility of adjusting a worktop of the workstation in height, i.e. vertically, allows the workstation to be adapted to the body size of an individual working at the workstation, which can be an important prerequisite for an ergonomic working posture.

Whereas height adjustability in the past was often only possible to a relatively limited extent, with the aim of compensating for size differences within the range of the statistically relatively small standard deviation of body sizes of sitting adults, desks today, for example, are frequently equipped with extended height adjustability, making it possible to work in a standing position when necessary. Since prolonged working while standing may be perceived as unpleasant and/or tiring, it is important to be able to quickly adjust the worktop between heights that are suitable for working while standing and ones that are suitable for working while sitting without complications.

To be able to guarantee safety when using in particular motorised height-adjustable pieces of furniture, equipping these with a safety mechanism is known.

Known safety mechanisms comprise a sensor, which measures a deformation or a displacement of two components of a piece of furniture with respect to one another. The sensor records a change between the components which is caused by a resistance against one of the components. For example, such sensors can be arranged between the frame and the tabletop of a desk. If the tabletop comes into contact, for example, with a resistance such as part of a user's body during the height adjustment, then the sensor records the associated change between the frame and tabletop. The automatic height adjustment of the desk is then immediately stopped by the safety mechanism.

However, difficulties can arise from the previously mentioned cabling of electrical device in such height-adjustable pieces of furniture. In particular, adjusting the piece of furniture upwards can lead to a tensile force acting on a cable and impairs this. Especially in the case of motorised height-adjustable pieces of furniture or tables, tensile forces can act on the cables, which damage or even tear these. For example, when using a height-adjustable desk, a cable can be obstructed by an item unintentionally placed thereon, such as a floor lamp, when the tabletop is in a lower position. If the tabletop is then raised, the cable is then clamped between the object placed thereon and the electrical device on the tabletop until it is damaged or tears or the electrical device falls from the tabletop. On the one hand, this can pose a risk for the user of the table and, on the other hand, items such as the electrical devices can be damaged in the process.

The object of the following invention is therefore to propose a height-adjustable piece of furniture or a component thereof, with which the safety in respect of the cable on or guided to the piece of furniture can be guaranteed.

BRIEF SUMMARY OF THE INVENTION

This object is achieved according to the invention by a height-adjustable table as defined in the following, and by a cable protector as defined in the following. Advantageous alternative embodiments of the invention are also defined in the following.

In one aspect the invention is a height-adjustable piece of furniture comprises a lower part which can be set down on the floor, an upper part, an actuating device, a first reference section, a second reference section, a deformation sensor and a cable protector. The height-adjustable piece of furniture can particularly be an automatic or motorised height-adjustable table or desk.

A distance between the lower part and the upper part can be adjusted by means of the actuating device, particularly in an automatic or motorised manner. Thus the upper part can be adjusted in height when the lower part is set on the floor. For setting on the floor, the lower part can be equipped with a sufficient number of feet.

The deformation sensor is arranged or designed to detect a change between the first reference section and the second reference section. It is also connected to the actuating device such that a signal from the deformation sensor can be transmitted to the actuating device. The connection can be realised by means of a data cable or also wirelessly. The term "change between the first reference section and the second reference section" relates in this context to a physical relative change of the two reference sections. This can be caused by a deformation or a repositioning or relocation of at least one of the two reference sections or components on which the reference sections are formed.

The actuating device is configured to stop a change of the distance between the lower part and the upper part if the signal transmitted by the deformation sensor corresponds to a change between the first reference section and the second reference section which exceeds a predefined threshold value. The threshold value can be pre-set in the deformation sensor or in the actuating device. It can also be configured or adjusted by a user. Together with the deformation sensor, the actuating device provides a safety mechanism with which the safety of operating the height-adjustable piece of furniture can be improved or guaranteed.

A cable can be mounted on the cable protector. The cable protector is coupled such to the first reference section and the second reference section that a tensile force which acts on the cable mounted on the cable protector brings about a change between the first reference section and the second reference section. The term "couple" in this context can relate to any direct or indirect connection with the reference sections which facilitates an effect on these.

The change being detectable or recordable by the deformation sensor between the first reference section and the second reference section can comprise a relative deformation between the first reference section and the second reference section. Alternatively or additionally, it can comprise a change to the distance between the first reference section and the second reference section. It can also comprise any other relative change to position or direction of the reference section.

The cable protector according to the invention makes it possible to use the deformation sensor or the safety mechanism realised by means of said deformation sensor to secure the cable as well. In particular, the stop mechanism, which can be provided to secure a motorised height adjustment, can be used in the process to secure the cable from damage as well. In this way, the safety of the height-adjustable piece of furniture with regards to risks resulting from damage to the cable can be guaranteed.

The cable protector is preferably designed such that a tensile force on the cable of approximately 300 Newtons (N) at the most, of approximately 200 N at the most or of approximately 100 N at the most effects a change exceeding the threshold value between the first reference section and the second reference section. Live power cables must usually fulfil regulatory conditions for a minimal tear strength, as defined in the relevant standards for example. Live power cables are thus meant to be prevented in particular from breaking too quickly or being damaged in any other way, thereby endangering people. Damage to widely approved cables can be prevented in that the cable protector is configured for the safety mechanism of the height-adjustable piece of furniture to start when the tensile force on the cable is 100 N, 200 N or 300 N or exceeds these values in each case. In known measuring procedures for testing whether a standard is complied with, the tensile force is continually increased until the tabletop stops rising. With the preferred embodiment of the invention described above, it can be ensured that the safety mechanism starts when the tensile force is increased, no later than at the standard values of 100 N, 200 N or 300 N. It can thus be ensured that standardised cables are not damaged or are secured.

In order to provide appropriate sensitivity, the deformation sensor preferably comprises a piezo element or a piezo sensor. The term "piezo element" relates in this context to a component which uses a piezo effect in order to produce an electric voltage upon the action of a mechanical force. The piezo effect here can be a piezoresistive effect, which describes the change of electrical resistance of a material by means of pressure or tension.

As an alternative or in addition to the piezo element, the deformation sensor can also be equipped with other measuring devices. For example, it can comprise optical or acoustic measuring devices or similar.

The upper part preferably has a supporting frame and a tabletop held by said supporting frame, wherein the cable protector is mounted on the tabletop or on the supporting frame and the supporting frame comprises the first reference section and the tabletop comprises the second reference section. This can make it possible to efficiently and sufficiently precisely configure the cable protector.

The cable protector preferably comprises a deflection lever, which is connected to the first reference section or the second reference section to tilt about an axis of rotation. Here, the cable protector is preferably designed such that tilting of the deflection lever about the axis of rotation transmits a force to whichever of the first reference section or of the second reference section to which the deflection lever is not rotatably connected. Such a deflection lever makes it possible to efficiently bring about a change between the first reference section and the second reference section when a tensile force acts on the cable. The deflection lever virtually translates the tensile force into a variable or movement that can be recorded by the safety mechanism.

The cable can preferably be mounted on the deflection lever of the cable protector. Thus the tensile force can be transmitted directly to the deflection lever and transferred from this to the reference sections. The deflection lever in this regard is preferably equipped with a cable fastening device. Such a cable fastening device can allow the cable to be efficiently mounted on the deflection lever in a reversible manner. The cable fastening device can, for example, have a clamping structure, by means of which the cable can be clamped to the deflection lever.

The actuating device preferably triggers a counteracting change in the distance between the lower part and the upper part before stopping the change in distance between the lower part and the upper part if the signal transmitted by the deformation sensor corresponds to a change between the first reference section and the second reference section that exceeds a predefined threshold value. In this way, this tensile force can be reduced in addition to stopping the increase in the tensile force on the cable. This can further improve the safety of the system.

In another aspect the invention is a cable protector which is configured for a height-adjustable piece of furniture as described above. The cable protector is configured or designed such that a cable can be mounted thereon. It is further configured or designed such that it can be coupled to a first reference section of the height-adjustable piece of furniture and a second reference section of the height-adjustable piece of furniture such that a change between the first reference section and the second reference section brings about a tensile force on the cable mounted on the cable protector.

Such a cable protector enables the effects and advantages described above in connection with the height-adjustable piece of furniture according to the invention to be efficiently implemented. In addition, an existing height-adjustable piece of furniture being equipped with a deformation sensor can be efficiently retrofitted with the cable protector.

BRIEF DESCRIPTION OF THE DRAWINGS

Further advantageous embodiments of the invention arise from the following description of exemplary embodiments of the invention with reference to the schematic drawing. In particular, the height-adjustable piece of furniture according to the invention and the cable protector according to the invention are described below in more detail with reference to the attached schematic drawings on the basis of exemplary embodiments. Brief description of the drawings.

DETAILED DESCRIPTION OF EMBODIMENTS OF THE PRESENT INVENTION

Figure 1:
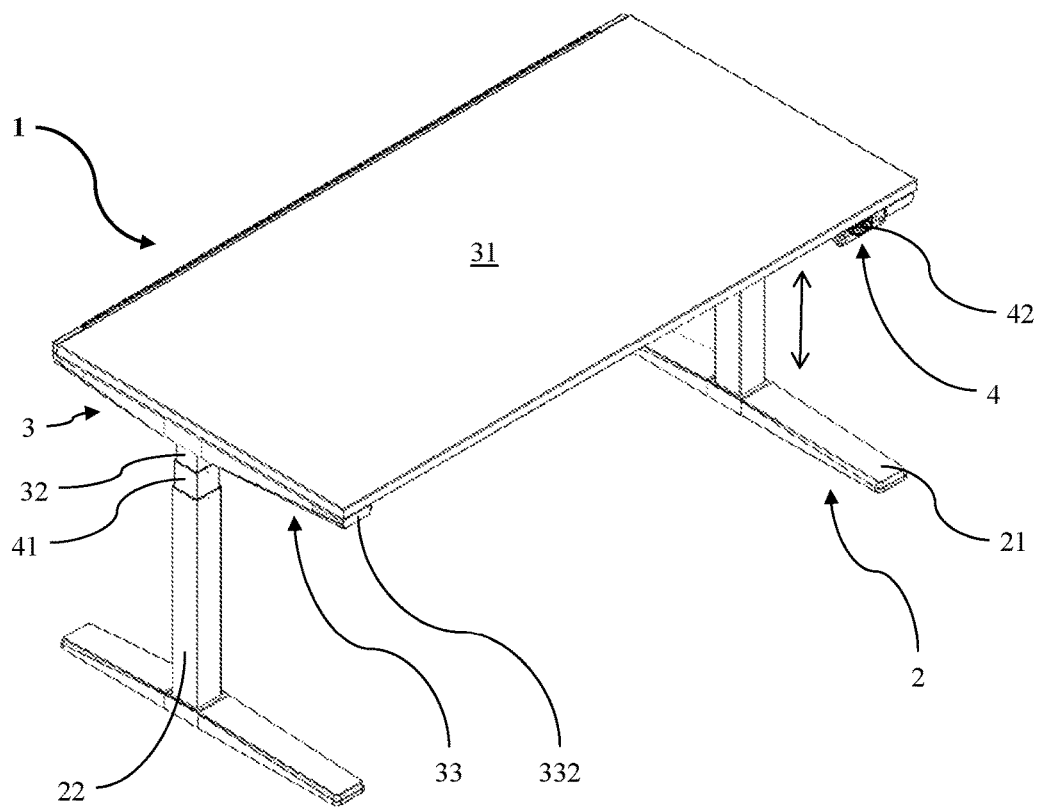
FIG. 1 shows a perspective view from above of a desk as an exemplary embodiment of a height-adjustable table according to the invention.

Certain expressions are used in the following description for practical reasons and must not be construed as limiting. The words "right", "left", "down" and "up" designate directions in the drawing to which reference is made. The expressions "inward", "outward", "below", "above", "left", "right" or the like are used to describe the arrangement of designated parts relative to one another, the movement of designated parts relative to one another, and the directions toward or away from the geometric centre of the invention as well as named parts of same, as depicted in the figures. These relative spatial indications also comprise positions and orientations other than the ones depicted in the figures. For example, if a part depicted in the figures is turned over, then elements or features described as "below" are then "above". The terminology comprises the words expressly mentioned above, derivatives thereof, and words of similar meaning.

In order to avoid repetitions in the figures and in the associated description of the different aspects and exemplary embodiments, certain features should be understood as common to different aspects and exemplary embodiments. The omission of an aspect from the description or from a figure does not mean that this aspect is lacking in the associated exemplary embodiment. Instead, such an omission may be made for the sake of clarity and for avoiding repetitions. In this regard, the following specification applies to the entire further description: If there are reference signs are in a figure for the sake of graphic clarity, but not mentioned in the immediately associated descriptive text, then reference shall be made to the explanation thereof in preceding figure descriptions. Furthermore, if reference signs are mentioned in the descriptive text immediately associated with a figure, but are not present in the associated figure, reference shall be made to the preceding and following figures. Similar reference signs in two or more figures stand for similar or the same elements.

FIG. 1 shows a desk 1 as an exemplary embodiment of a height-adjustable table. The desk 1 comprises a lower part 2, an upper part 3 and an actuating device 4 for automatic adjustment of a distance between the lower part 2 and the upper part 3. The lower part 2 comprises two feet 21 set on a floor and two base columns 22 each extending vertically upwards from one of the feet 21. The feet 21 are each formed as a horizontal beam and the base columns 22 each as a square tube.

The upper part 3 has a rectangular tabletop 31, two connecting columns 32 and a supporting frame 33 comprising two T-struts 332. The T-struts 332 of the supporting frame 33 are each arranged along one of the shorter sides of the tabletop 31 and firmly connected to same. They support the tabletop 31. In the centre, the connecting columns 32 each extend vertically downwards from one of the T-struts 332. The connecting columns 32 are designed as cylinders with a square cross-section which is somewhat smaller than the square cross-section of the base columns 22.

The actuating device 4 comprises two telescopic columns 41 and a control unit 42. The telescopic columns 41 are each designed as square tubes. They extend vertically, wherein they are each inserted downwards into one of the base columns 22 of the lower part 2 and each accommodate one of the connecting columns 32 from above. The base columns 22, the telescopic columns 41 and the connecting columns 32 each together form a telescope, which can be adjusted by means of a drive mechanism. In particular, the columns can be moved out and into one another such that each of the telescopes can be appropriately extended or shortened. Thus the distance between the upper part 3 and lower part 2 and consequently the height of the tabletop 31 can be adjusted. The control unit 42 enables a user of the desk 1 to adjust its height and raise and lower the tabletop 31.

Figure 2:
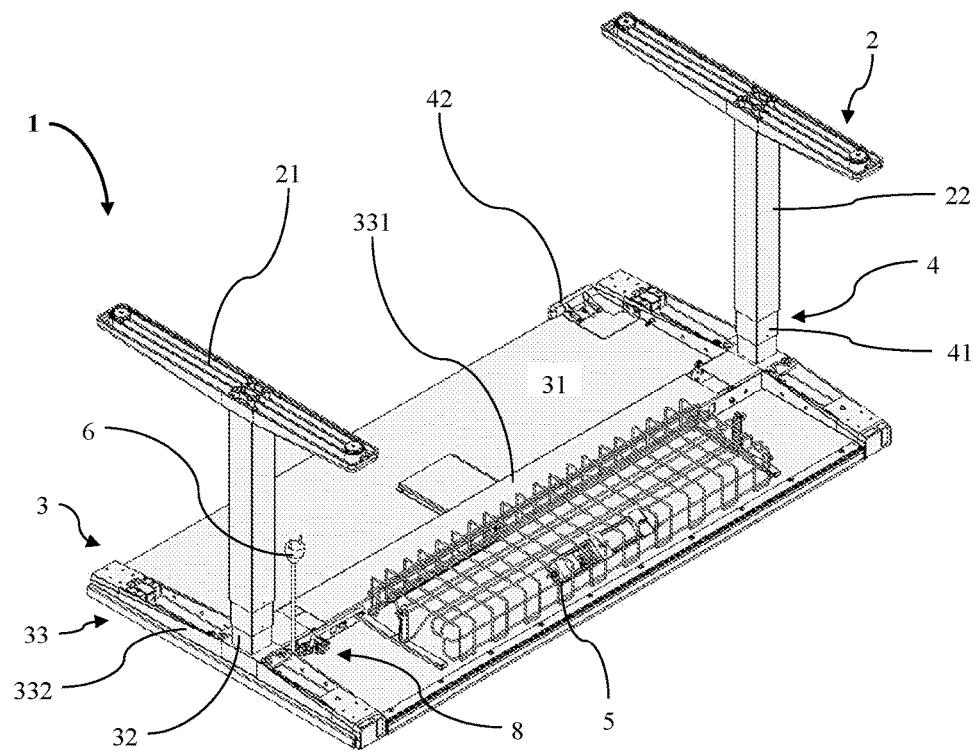
FIG. 2 shows a perspective view from below of the desk from FIG. 1.

In FIG. 2, the desk 1 is rotated by 180° as compared with FIG. 1 such that the lower part 2 is positioned above and the upper part 3 is positioned below. Thus it is visible that the supporting frame 33 of the upper part 3 has a cross-strut 331, which connects each of the two T-struts 332 to one another at a right angle to the cross-strut 331. A basket 5 is mounted on the underside of the tabletop 31, in which basket various items such as a power cable connector can be positioned in a close arrangement to the tabletop 31. An exemplary embodiment of a cable protector 8 according to the invention is mounted on the cross-strut 331 of the supporting frame 33. A cable 6 is connected to the desk 1 by means of the cable protector 8. The cable 8 can be used in particular to provide power for items placed on the tabletop 31.

Figure 3:
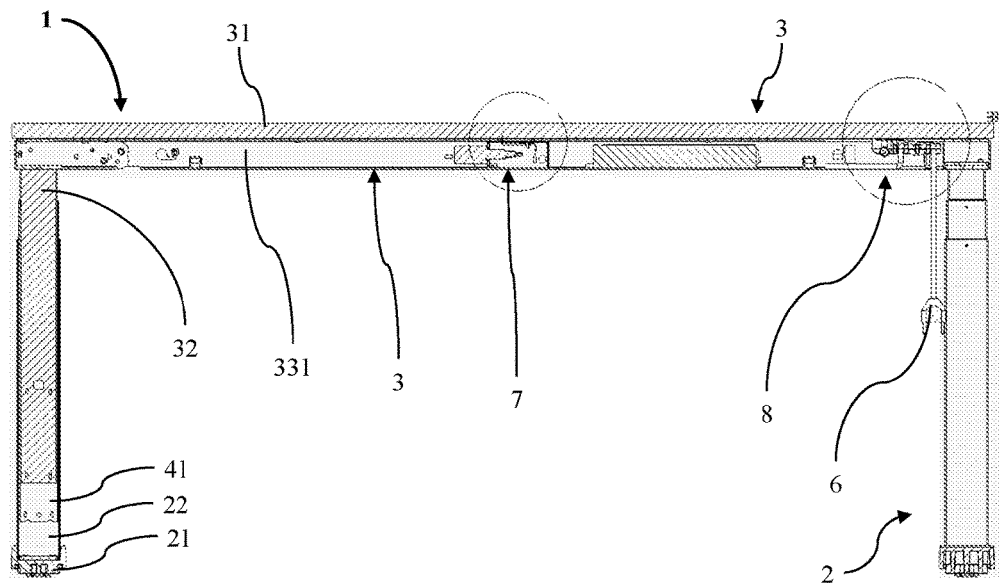
FIG. 3 shows a partly sectional front view of the desk from FIG. 1.

As is shown in FIG. 3, a deformation sensor 7 and a motor 43 of the actuating device 4 are arranged in the cross-strut 331 of the supporting frame 33. The motor 43 is connected to the telescopic mechanism and powers this to adjust the height of the tabletop 31. The columns of the telescope are formed such that the telescopic column 41 of the actuating device 4 can be moved vertically in a stably guided manner in each case in the associated base column 22 of the lower part 2. The telescopic column 41 and the base column 22 are designed as hollow square tubes. The connecting columns 32 of the supporting frame 3 are designed in a solid manner and formed such that they can also be moved vertically in a stably guided manner in each case in the associated telescopic column 41.

Figure 4:
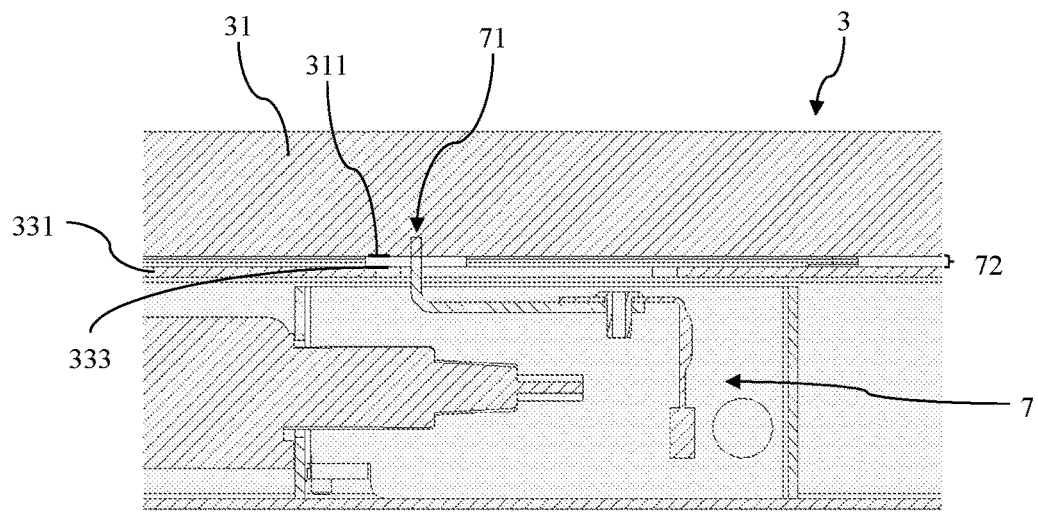
FIG. 4 shows a view of a deformation sensor of the desk from FIG. 1 in the detail F from FIG. 3.

FIG. 4 shows the structure of the deformation sensor 7 in detail. The deformation sensor 7 is mounted in the cross-strut 331 of the supporting frame 33 and comprises a piezo element 71 or a piezo sensor. The underside of the tabletop 31 forms a first reference section 311 and the top side of the cross-strut 331 forms a second reference section 333. By means of the piezo element 71, the deformation sensor 7 detects a change in a reference distance 72 between the tabletop 31 and the supporting frame 33 or its cross-strut 311. The deformation sensor 7 is connected to the actuating unit 4 such that signals from the deformation sensor 7 can be transmitted to the actuating unit. If the change of reference distance 72 during a change in the height of the tabletop 31 exceeds a predefined threshold value, then the actuating device stops the change in height and moves the tabletop 31 back slightly in the opposite direction.

The deformation sensor 7 can be provided for safe and failure-free operation of the height-adjustable desk 1. For example, an object or a person can be in the way when the tabletop 31 is lowered. If the tabletop 31 comes into contact with the object or person, then it is at least slightly deformed in relation to the supporting frame 33, which causes a change in the reference distance 72. By means of the piezo element 71, the deformation sensor 7 can detect such relatively fine changes.

Figure 5:
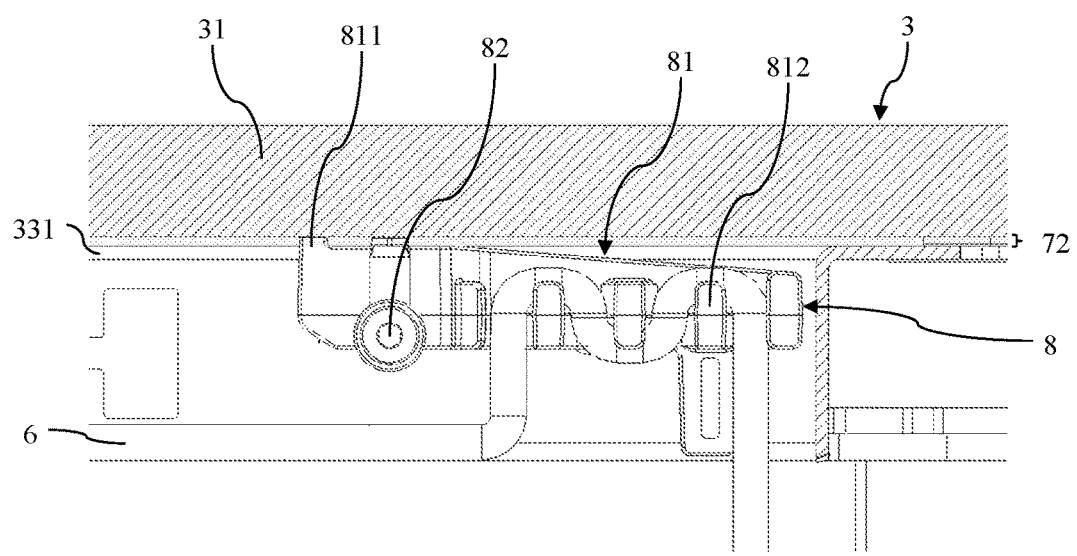
FIG. 5 shows a view of a cable protector of the desk from FIG. 1 in the detail E from FIG. 3 in an untilted position.

FIG. 5 shows details of the cable protector 8, which comprises a deflection lever 81 and an axis of rotation 82. The deflection lever 81 is attached to the cross-strut 331 in a tiltable manner by means of the axis of rotation 82. In the region of its one longitudinal end (the left longitudinal end in FIG. 5) it has an impact nose 811 directed upwards to the tabletop 31. From approximately the middle of the deflection lever 81, a cable fastening device 812 extends along the deflection lever 81. The cable 6 is connected to the deflection lever 81 by means of the cable fastening device 812. In particular, the cable fastening device 812 comprises three clamping sections, into which the cable 6 is clamped in a winding or S-shaped manner. In the region of the right longitudinal end of the deflection lever 81, the cable 6 extends vertically downwards in the direction of the floor.

The axis of rotation 82 is connected eccentrically to the deflection lever 81 such that the part comprising the impact nose 811 on the left of the axis of rotation 82 is shorter than the part comprising the cable fastening device 812 on the right of the axis of rotation 82. The impact nose 811 is positioned on the underside of the tabletop 31. In the position in FIG. 5, the deflection lever 81 is in a normal starting position, i.e. oriented in an untilted or horizontal manner.

Figure 6:
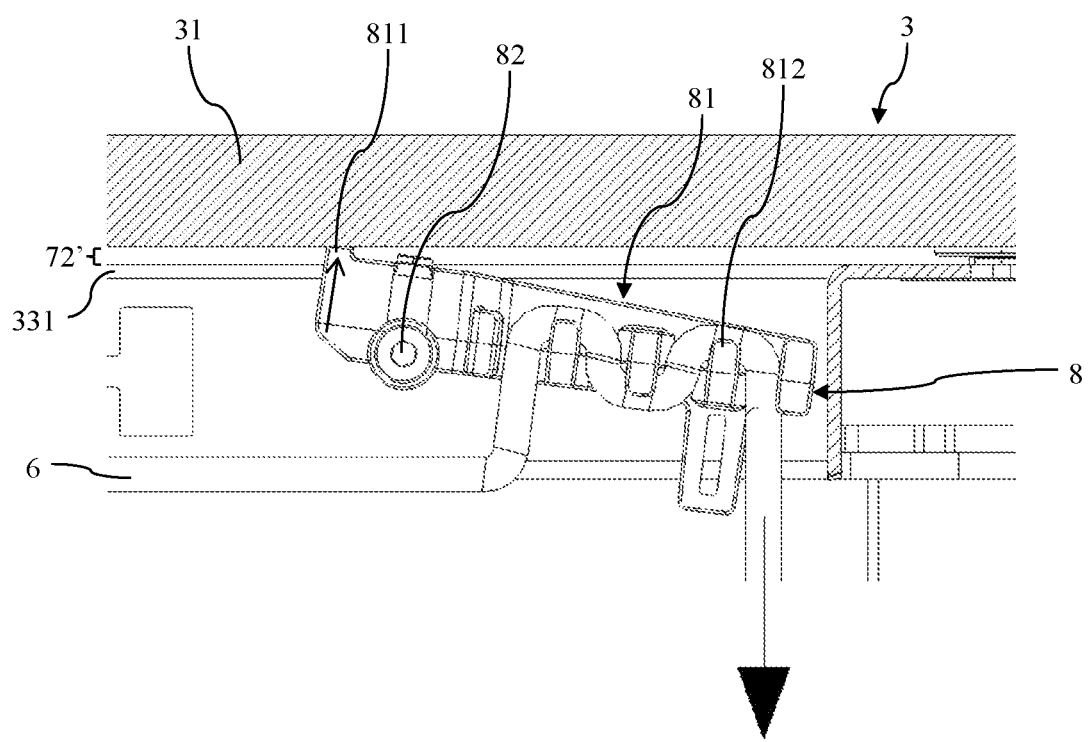
FIG. 6 shows a view of a cable protector of the desk from FIG. 1 in the detail E from FIG. 3 in a tilted position.

In FIG. 6, a tensile force acts downwards on the cable 6. For example, this can occur if the cable 6 is obstructed on the floor while the tabletop 31 is raised. The tensile force is transmitted via the cable fastening device 812 to the deflection lever 81 such that said deflection lever is tilted in the clockwise direction about the axis of rotation 82. The tabletop 31 and/or cross-strut 33 is thus bent and the reference distance 72' between the two is increased. This is accompanied by a change in the distance between the first reference section 311 and the second reference section 333. The deformation sensor 7 detects this change and the safety mechanism, as described above in relation to FIG. 4, is activated. In particular, the raising of the tabletop 31 is stopped in the process. In this way, the tensile force can be prevented from further increasing and the cable 6 can be prevented from being damaged.

Although the invention is shown and described in detail by means of the figures and the associated description, this representation and this detailed description are to be understood as illustrative and exemplary, but not as limiting the invention. In order not to embellish the invention, in certain cases well-known structures and technologies may not be shown and described in detail. It is clear that persons skilled in the art can make changes and modifications without going beyond the scope of the following claims. In particular, the present invention covers further exemplary embodiments comprising any combinations of features that may deviate from the explicitly described combinations of features.

The present disclosure also comprises embodiments having any combination of features that are mentioned or shown before or after the different embodiments. It also comprises individual features in the figures, even if they are shown therein in relation to other features and/or not mentioned above or below. The alternatives to embodiments and individual alternatives to the features thereof described in the figures and in the description may also be excluded from the subject matter of the invention or from the disclosed subjects. The disclosure comprises embodiments that exclusively comprise the features described in the claims or in the exemplary embodiments, as well as embodiments that comprise other additional features.

In addition, the expression "comprise" and derivatives thereof do not exclude other elements or steps. The indefinite article "a" or "an" and derivatives thereof likewise do not exclude a plurality. The functions of a plurality of the features cited in the claims can be fulfilled by a unit or by a step. In particular, the terms "substantially", "about", "approximately" and the like used in connection with a property or a value also define the property precisely or define the value precisely. When used in connection with a given numerical value or range, the terms "about" and "approximately" can refer to a value or range that lies within 20%, within 10%, within 5%, or within 2% of the given value or range.

What is claimed is:

1. A height-adjustable piece of furniture comprising:
    a lower part of the piece of furniture which can be set down on a floor;
    an upper part of the piece of furniture attached to the lower part;
    an actuating device of the piece of furniture, wherein a distance between the lower part and the upper part can be adjusted by means of the actuating device;
    a first reference section on the upper part of the piece of furniture;
    a second reference section on the upper part of the piece of furniture;
    a cable protector configured to have a cable mounted thereon, the cable protector being coupled to the first reference section and the second reference section such that when a tensile force acts on a cable mounted on the cable protector, the cable protector moves to come into contact with one of the first reference section and the second reference section to cause a change between the first reference section and the second reference section; and
    a deformation sensor, wherein the deformation sensor
        is attached to the upper part of the piece of furniture to detect the change between the first reference section and the second reference section, and
        is connected to a control unit of the actuating device such that a signal of the deformation sensor can be transmitted to the control unit of the actuating device, and
    wherein the actuating device is configured to stop changing the distance between the lower part and the upper part of the piece of furniture if the signal transmitted by the deformation sensor corresponds to the change between the first reference section and the second reference section exceeding a predefined threshold value.

2. The height-adjustable piece of furniture according to claim 1, wherein the deformation sensor comprises a piezo element.

3. The height-adjustable piece of furniture according to claim 1, wherein the upper part has a supporting frame and a tabletop held by the supporting frame, wherein the cable protector is mounted on the tabletop or on the supporting frame and the tabletop comprises the first reference section and the supporting frame comprises the second reference section.

4. The height-adjustable piece of furniture according to claim 1, wherein the cable protector comprises a deflection lever, which is connected to the first reference section or the second reference section such that when a tensile force acts on the cable mounted on the cable protector said deflection lever can be tilted about an axis of rotation.

5. The height-adjustable piece of furniture according to claim 4, wherein the cable protector is formed such that tilting of the deflection lever about the axis of rotation transmits a force to whichever of the first reference section or of the second reference section to which the deflection lever is non-rotatably connected.

6. The height-adjustable piece of furniture according to claim 4, wherein a cable can be mounted on the deflection lever of the cable protector.

7. The height-adjustable piece of furniture according to claim 6, wherein the deflection lever is equipped with a cable fastening device.

8. The height-adjustable piece of furniture according to claim 1, wherein the actuating device triggers a counteracting change in the distance between the lower part and the upper part before the change in distance between the lower part and the upper part is stopped if the signal transmitted by the deformation sensor corresponds to the change between the first reference section and the second reference section exceeding the predefined threshold value.

9. The height-adjustable piece of furniture according to claim 1, wherein the change detectable by the deformation sensor between the first reference section and the second reference section comprises a relative deformation between the first reference section and the second reference section.

10. The height-adjustable piece of furniture according to claim 1, wherein the change between the first reference section and the second reference section being detectable by the deformation sensor comprises a change in distance between the first reference section and the second reference section.

11. The height-adjustable piece of furniture according to claim 1, wherein the cable protector is configured such that a tensile force on a cable mounted thereon of approximately 300 N at the most, of approximately 200 N at the most or of approximately 100 N at the most brings about the change between the first reference section and the second reference section which exceeds the predefined threshold value.

12. A cable protector for a height-adjustable piece of furniture, wherein the cable protector includes
   a cable fastening device that is configured to have a cable mounted thereon, and
   a deflection lever that is configured to be coupled to one of a first reference section of the height-adjustable piece of furniture and a second reference section of the height-adjustable piece of furniture,
   wherein if a tensile force acts on a cable mounted on the cable protector, the deflection lever can be moved to transmit a force to whichever of the first reference section or of the second reference section that is not coupled to the deflection lever.

13. The cable protector according to claim 12, wherein the deflection lever is equipped with the cable fastening device.

* * * * *